US012039622B2

(12) United States Patent
Onal et al.

(10) Patent No.: US 12,039,622 B2
(45) Date of Patent: Jul. 16, 2024

(54) COURSE ASSIGNMENT BY A MULTI-LEARNING MANAGEMENT SYSTEM

(71) Applicant: Google LLC, Mountain View, CA (US)

(72) Inventors: Erhan Onal, Sunnyvale, CA (US); Bryan Lee Baker, Palo Alto, CA (US); Justin Michael Emge, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 91 days.

(21) Appl. No.: 17/314,600

(22) Filed: May 7, 2021

(65) Prior Publication Data

US 2022/0358611 A1 Nov. 10, 2022

(51) Int. Cl.
*G06Q 10/00* (2023.01)
*G06F 16/28* (2019.01)
*G06Q 10/06* (2023.01)
*G06Q 50/20* (2012.01)

(52) U.S. Cl.
CPC ....... *G06Q 50/2057* (2013.01); *G06F 16/285* (2019.01)

(58) Field of Classification Search
CPC .......................... G06Q 50/2057; G06F 16/285
USPC .................................................. 705/328, 1.1
See application file for complete search history.

(56) References Cited

U.S. PATENT DOCUMENTS

| | | | | |
|---|---|---|---|---|
| 8,620,831 B1 * | 12/2013 | Adams | ........................ | G06Q 10/10 705/326 |
| 8,838,015 B2 * | 9/2014 | Packard | ........................ | G09B 5/00 434/323 |
| 11,151,672 B2 * | 10/2021 | Terra | ........................ | G06Q 50/2053 |
| 2015/0193699 A1 * | 7/2015 | Kil | ........................ | G06N 5/022 706/12 |
| 2015/0242979 A1 * | 8/2015 | Abts | ........................ | G06Q 50/2057 705/328 |
| 2018/0114141 A1 * | 4/2018 | Tseng | ........................ | G06N 7/023 |

(Continued)

FOREIGN PATENT DOCUMENTS

KR 2015-0053317 * 5/2015

OTHER PUBLICATIONS

Endsley, Abigail "Course Codes 101: A Beginner's Guide to Course Codes and Transfer Credit", Pearson, Aug. 31, 2020, https://pearsonaccelerated.com/blog/course-codes-101-a-beginners-guide-to-course-codes-and-transfer-credit (Year: 2020).*

(Continued)

*Primary Examiner* — Jonathan P Ouellette
(74) *Attorney, Agent, or Firm* — Lerner David LLP

(57) ABSTRACT

Methods, systems, and apparatus, including computer-readable storage media, for course assignment by a multi-learning management system. The system can receive data from a variety of individual learning management systems offering different courses. The system can use feedback data of a user base for the system to cluster courses by predicted difficulty, and generate, from the clusters, a sequence of courses for a target user. The sequence of courses can include at least one course from each cluster, with courses from a first cluster with a lower overall difficulty measure preceding courses in a second cluster with a higher overall difficulty measure in the sequence, wherein the starting cluster can be calculated according to the estimated level of the target user.

20 Claims, 9 Drawing Sheets

(56) References Cited

U.S. PATENT DOCUMENTS

| | | | | |
|---|---|---|---|---|
| 2020/0090127 | A1* | 3/2020 | Masood | G06Q 10/103 |
| 2020/0357296 | A1* | 11/2020 | Sharma | G06Q 50/2057 |
| 2023/0044523 | A1* | 2/2023 | Ashford | G06Q 50/205 |
| 2023/0078010 | A1* | 3/2023 | Armanious | G06F 16/248 |
| | | | | 707/722 |

OTHER PUBLICATIONS

What is the Experience [online] [retrieved May 5, 2021]. Retrieved from the Internet: <URL:http://www.xapi.com/overview/.html>, 8 pages.

LinkedIn Learining: Keep learning in the moments that matter [online] [retrieved May 5, 2021]. Retrieved from the Internet: <URL:https://www.linkedin.com/learning/.html>, 8 pages.

Everything you need to engage and educate your audiences [online] [retrieved May 7, 2021]. Retrieved from the Internet: <URL:https://www.intellum.com/platform/overview/.html>, 9 pages.

Degreed: The Upskilling Platform [online] [retrieved May 7, 2021]. Retrieved from the Internet: <URL:https://explore.degreed.com/product.html>, 15 pages.

Deliver a World-Class Learning Experience [online] [retrieved May 7, 2021]. Retrieved from the Internet: <URLhttps://www.edcast.com/corp/products/lxp/.html>, 13 pages.

\* cited by examiner

COURSE ASSIGNMENT BY A MULTI-LEARNING MANAGEMENT SYSTEM

BACKGROUND

A learning management system (LMS) is a software platform for delivering content in the form of educational courses, which can include interactive classes, training modules, and/or media in the form of video or audio lectures. Users of an LMS sign up and participate in a course related to a particular topic. A LMS can maintain a catalog of courses each corresponding to a different topic.

An enterprise may leverage one or more LMSs for training their employee-users to improve at different skills corresponding to their scope of employment. However, different LMSs can host the same or different courses as one another, often in different formats and categorized according to different tags or labels. LMSs follow different criteria for applying labels to courses, making it difficult to reconcile the differences in a manner that is useful for an enterprise in deciding which courses would be most effective for developing the skills of its employees.

BRIEF SUMMARY

Aspects of the disclosure provide for a method, the method including receiving, by one or more processors, first data including one or more respective difficulty scores for each of a plurality of courses, wherein each course corresponds to a topic and is from one or more multiple learning management systems; receiving, by the one or more processors, second data including respective expertise scores measuring a level of expertise in the topic for each of a plurality of users; generating, by the one or more processors and for each course, a respective overall difficulty measure based at least on the respective difficulty scores for the course in the first data, and respective expertise scores for at least a first user of the plurality of users; clustering, by the one or more processors, the plurality of courses into a plurality of clusters; and generating, by the one or more processors, a sequence of courses for the first user, including at least one course from each of the plurality of clusters.

Aspects of the disclosure also provide for a system including one or more processors configured to receive first data including one or more respective difficulty scores for each of a plurality of courses, wherein each course corresponds to a topic and is from one or more of multiple learning management systems; receive second data including respective expertise scores measuring a level of expertise in the topic for each of a plurality of users; generate, for each course, a respective overall difficulty measure based at least on the respective difficulty scores for the course in the first data, and respective expertise scores for at least a first user of the plurality of users; cluster the plurality of courses into a plurality of clusters; and generate a sequence of courses for the first user, including at least one course from each of the plurality of clusters.

Aspects of the disclosure also provide for one or more non-transitory computer-readable storage media storing instructions that when executed by one or more processors, cause the one or more processors to perform operations including receiving first data including one or more respective difficulty scores for each of a plurality of courses, wherein each course corresponds to a topic and is from one or more of multiple learning management systems; receiving second data including respective expertise scores measuring a level of expertise in the topic for each of a plurality of users; generating, for each course, a respective overall difficulty measure based at least on the respective difficulty scores for the course in the first data, and respective expertise scores for at least a first user of the plurality of users; clustering the plurality of courses into a plurality of clusters; and generating a sequence of courses for the first user, including at least one course from each of the plurality of clusters.

Each cluster can represent one or more courses, and each course represented in a cluster can correspond to a respective overall difficulty measure within a respective range associated with the cluster. Courses in a first cluster with a lower overall difficulty measure can precede courses in a second cluster with a higher overall difficulty measure in the sequence of courses.

Each cluster can correspond to a respective difficulty label. Each course in each cluster can be labeled with the respective same difficulty label.

The method or operations can further include receiving, as part of the first data, feedback for one or more courses identified as having been completed by the first user; and identifying a starting difficulty threshold based at least on the respective expertise scores for the first user and the feedback for the one or more courses. Generating the sequence of courses can include generating the sequence to include only courses with a respective overall difficulty threshold meeting or exceeding the starting difficulty threshold for the first user.

The one or more processors can be further configured to receive, as part of the first data, feedback for one or more courses identified as having been completed by the first user; and identify a starting difficulty threshold based at least on the respective expertise scores for the first user and the feedback for the one or more courses. In generating the sequence of courses, the one or more processors can be configured to generate the sequence to include only courses with a respective overall difficulty threshold meeting or exceeding the starting difficulty threshold for the first user.

Generating the sequence of courses can further include identifying courses that have been marked as completed by the first user; and excluding the identified courses from the sequence of courses.

Receiving the feedback for the one or more courses can include: identifying computer software source code identified as authored by the first user; analyzing the source code to identify one or more topics categorizing the source code, including a first topic; prompting one or more user computing devices for expertise scores of the first user with regard to the one or more topics; and receiving as part of the feedback for the one or more courses, expertise scores from the one or more user computing devices, including one or more expertise scores of the first user corresponding to the first topic.

The method or operations can further include generating, for presentation on a user interface of a user computing device, data representing: a visual representation of the sequence of courses; and receiving, by the one or more processors, input to modify one or more of the courses in the sequence of courses, and in response to the input: updating the sequence of courses in accordance with the modification, and updating the data representing the visual representation of the modified sequence of courses.

The one or more processors can be further configured to generate, for presentation on a user interface of a user computing device, data representing: a visual representation of the sequence of courses; and receive, by the one or more processors, input to modify one or more of the courses in the sequence of courses, and in response to the input: update the sequence of courses in accordance with the modification, and update the data representing the visual representation of the modified sequence of courses.

The method or operations can further include receiving state data for each course in the sequence of courses, wherein the state data characterizes a respective completion state of each course by the first user; determining, from the state data, that a course in the sequence of courses has a completion state indicating course failure by the first user; and in response to the determining, generating an updated sequence of courses.

The one or more processors can be further configured to receive state data for each course in the sequence of courses, wherein the state data characterizes a respective completion state of each course by the first user; determine, from the state data, that a course in the sequence of courses has a completion state indicating course failure by the first user; and in response to the determining, generating an updated sequence of courses.

Generating the updated sequence of courses can include updating the sequence of courses to include only courses with corresponding overall difficulty measures at or below an overall difficulty measure for the course in the sequence of courses with the course failure completion state.

Generating the sequence of courses can further include receiving a total sequence length value specifying the total number of courses to include in the sequence and a minimum per-cluster course value specifying the minimum number of courses to include in the sequence of courses for each cluster; and generating the sequence of courses in accordance with the total sequence length value and the minimum course value.

Generating the sequence of courses can further include receiving one or more intra-cluster criteria for arranging courses in the sequence from the same cluster; and generating the sequence of courses in accordance with the one or more intra-cluster criteria.

The one or more intra-cluster criteria can include an intra-cluster difficulty criterion, and wherein generating the sequence of courses in accordance with the one or more intra-cluster criteria includes generating the sequence such that courses with lower overall difficulty measures precede courses from the same cluster with higher overall difficulty measures.

Aspects of the disclosure provide for a system that can generate a sequence of courses from different courses of individual and unrelated LMSs.

DETAILED DESCRIPTION

Overview

Figure 1:
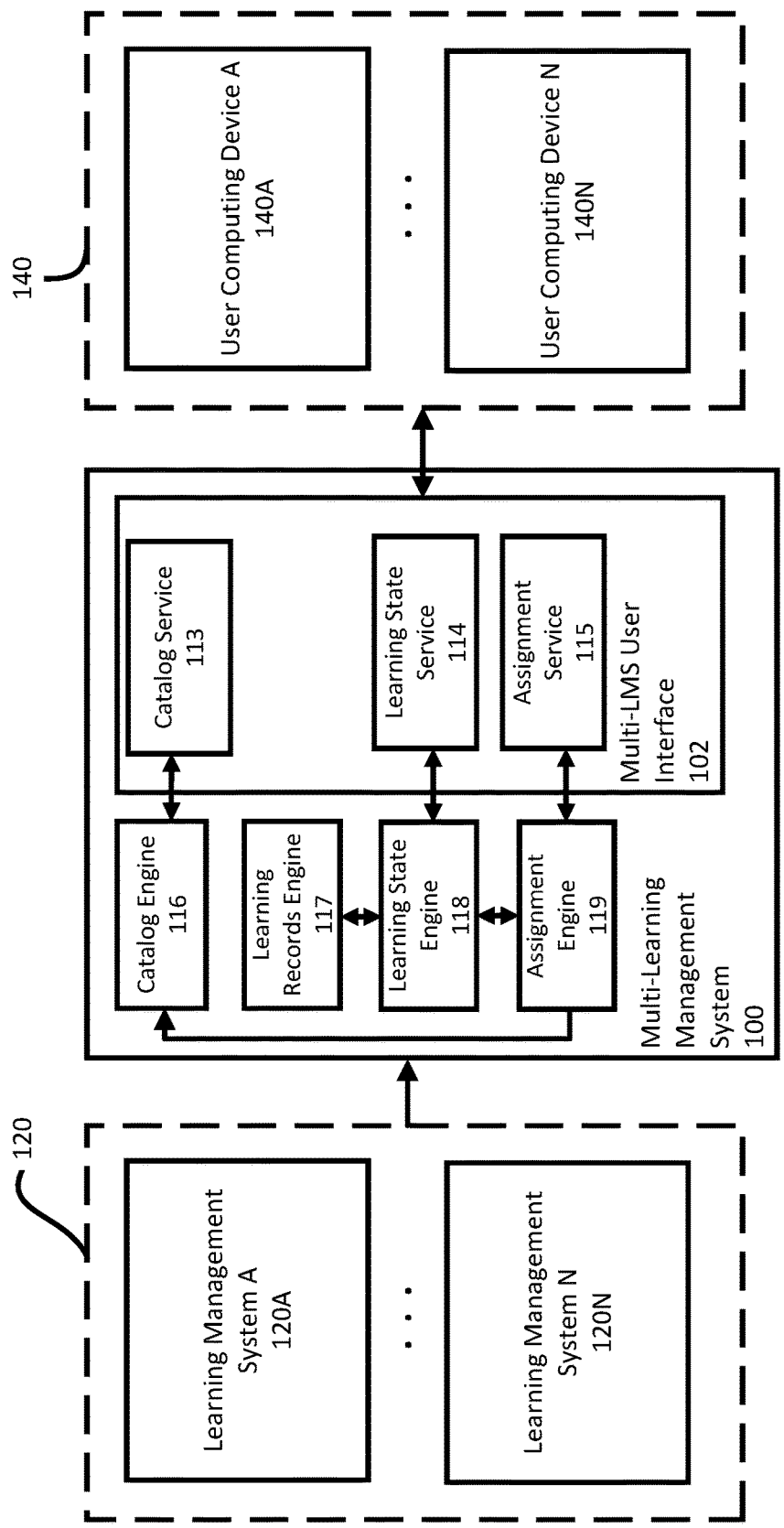
FIG. 1 is a block diagram of an example multi-learning management system, according to aspects of the disclosure.

A system implemented in accordance with aspects of the disclosure can generate a learning path as a sequence of courses for a user of a multi-learning management system (multi-LMS). A multi-LMS as described herein can process feedback data from a user base characterizing the overall difficulty of courses offered by a variety of different LMSs, and generate a sequence of courses for a particular user in the user base. The learning path is a sequence of courses assigned by the multi-LMS to a user based on quantifiable measures of user-expertise and course-difficulty. The multi-LMS can receive requests to generate a learning path, for example from one or more requesting computing devices, and in response, generate a corresponding sequence of courses.

A sequence of courses refers to one or more data structures representing an ordering of courses available in a catalog of a multi-LMS. Each course in a sequence can be represented by some data characterizing the course in the catalog, for example a unique identifier for the course and an overall difficulty measure associated with the course and used to order courses in the sequence. The ordering can refer to a suggested sequence for the target user to complete courses in, for example completing a first course before a second course in the sequence. Further, a multi-LMS can leverage feedback from a user base to assign tags to courses from different LMS catalogs in a manner that is contextually relevant to the average expertise and characteristics of the user base.

A challenge in aggregating resources from different platforms that perform a similar task, such as different LMSs providing courses or other educational resources, is accurately comparing data across the different platforms that may be similar in nature, but are not provided in a common format and/or generated according to the same criteria or standards. This problem is exacerbated in attempting to create a sequence of courses for a target user of a multi-LMS, at least because courses from different LMSs cannot be assumed to be accurately comparable. For example, a course that is labeled "easy" in one LMS, may be labeled "hard" in another LMS. Furthermore, in creating a sequence of courses for a target user, the sequence of courses has to be structured to reflect the natural progression of a target user as the courses are completed, for example by providing courses of generally easier difficulty before courses of generally harder difficulty.

If a naïve labeling of course difficulty and other characteristics as provided by different LMSs is followed, a sequence of courses may on its face include courses that range from easy to more difficult as-labeled, but in reality does not follow an accurate progression of increasing difficulty. In addition to the problem of incomparable data labeling courses from different LMSs, another problem is identifying measures by which courses or other educational resources can be standardized to accurately create a sequence of ascending course difficulty. Identifying these measures is also important when some or all of the courses of the different LMSs lack any difficulty classification data at all.

Aspects of the disclosure provide for a multi-LMS that can accurately consolidate courses from multiple, unrelated LMSs, and can generate a sequence of courses from those consolidated courses. Courses from disparate LMSs can be uniformly compared by the multi-LMS to take advantage of educational resources offered by multiple sources that are not designed to be compared and consolidated ordinarily. The multi-LMS can use signals received from a target user base, such as a collection of employee-users of an enterprise, to identify overall difficulty measures based on analyzing data characterizing the expertise of the target user base. In this way, the multi-LMS can add or augment labels and characteristics of existing courses that otherwise have little to no contextual relationship to a target user base.

Further, the multi-LMS as described herein can accurately place courses in a sequence according to desired criteria, such as scaling overall difficulty of courses from the beginning of a sequence of courses to its end. Accurate labeling of courses for a given sequence can improve the versatility of a multi-LMS in leveraging resources from different unrelated LMSs.

The multi-LMS can generate a sequence of courses for a target user based on feedback provided by the target user and other users of a target user base. The multi-LMS can be configured to prompt user computing devices of the target user base with questions relating to the difficulty of courses. The prompts can include questions related to the expertise of the target user at a topic, such as "functional programming," covered in the sequence of courses. In some implementations, the multi-LMS can generate a series of prompts to send by first analyzing software code identified as authored by the target user. The multi-LMS can identify one or more topics representing the software code, and in response generate prompts that include questions of the target user's expertise in the one or more identified topics.

Additionally, the multi-LMS can provide for a user interface for adjusting a sequence of courses based on several criteria, such as different numbers of clusters to categorize courses by different enumerated difficulty ranges, as well as criteria for selecting courses within the same cluster. The multi-LMS can be tuned to a variety of different criteria as described herein, which can further improve how courses from different LMSs are correctly compared and presented, despite possibly having initial difficulty labels with little to no common basis for comparison.

EXAMPLE SYSTEMS

FIG. 1 is a block diagram of an example multi-learning management system (multi-LMS) 100, according to aspects of the disclosure. The multi-LMS 100 can communicate with LMSs 120, which can include LMS A 120A through LMS N 120N, as well as other LMSs not shown in FIG. 1. The multi-LMS 100 can also communicate with user computing devices 140, which can include user computing device A 140A and user computing device N 140 N, as well as other user computing devices not shown in FIG. 1.

The user computing devices 140 can communicate with the multi-LMS 100 through a multi-LMS user interface 102. The user interface 102 can provide various services, including catalog service 113, learning state service 114, and assignment service 115. Each service can be implemented as hardware and/or software configured to perform operations corresponding to each service, which can include communicating with a respective engine of the multi-LMS 100 and providing input to and output from the respective engine, described in more detail herein.

The user computing devices 140 can communicate with the multi-LMS 100 through any network protocol, such as a web-based protocol over the internet. The user computing devices 140 can access services offered by the multi-LMS 100 through a web browser or software implemented on the user computing devices 140 for communicating with the multi-LMS 100. For example, a user computing device can access the multi-LMS 100 through an internal or external network link, and can interact with the multi-LMS 100 to provide and receive data through a web page or other user interface or graphical user interface.

The user computing devices 140 can be devices corresponding to users of an organization such as an enterprise or business. Each user of the organization can be associated with a corresponding user account, in which data relating to the user and data relating to courses assigned and completed by the user can be stored. The multi-LMS 100 is configured to manage and update user account data for a user base interacting with the multi-LMS 100 through the user computing devices 140. A user computing device can correspond to the user account of a particular user, although it is understood that in some examples the user computing device may interact with the multi-LMS 100 through different user accounts at different times. However, for ease of explanation, in this specification a given user computing device and a given user account are said to correspond to the same user.

When a user computing device interacts with the multi-LMS 100, the multi-LMS 100 can provide some or all services and data managed by the multi-LMS 100 based on the user account used by the user computing device in interacting with the multi-LMS 100. Each user computing device can correspond to a user of the organization with one or more roles, such as learner, manager, and administrator. Depending on the role associated with the user computing device, the user computing device can access and interact with one or more of the services 113, 114, and 115.

For example, a learner (indicated, for example, by certain permissions for a corresponding user account), may access only data related to their own performance and activity on the multi-LMS 100. A manager, by contrast, may manage a number of learners, and have access to user account data corresponding to each of the learners. In addition, the user account of a manager can be associated with certain permissions for generating and modifying sequence of courses for different learners, as described in more detail herein. Another type of role can be the administrator, who has permissions across the multi-LMS 100 to add or remove courses available on the multi-LMS originating from one or more of the LMSs 120.

Each of the LMSs 120 can be a separate platform or system for providing any form of media content, including educational, entertainment, and/or vocational content, as well as managing data and metrics for users of a respective LMS. The LMSs 120 can provide one or more courses, which may refer to any organization of educational content across one or more forms of media, including videos, pictures, text files, and audio. A course can be broken up logically into a group of units, and relate to a particular topic, such as "Java Functional Programming" The course may also include assignments to participating users, such as homework, quizzes, tests, or projects.

The multi-LMS 100 is configured to receive any data managed or generated by the individual LMSs 120. As an example, the multi-LMS 100 can receive course data and learning record data from each of the LMSs 120. Course data refers to any metadata characterizing courses available by a particular LMS. Course data can include available course titles, author of the course, length or duration or each course, when a course was published to the LMS, a URL or other link to where the course is hosted, description of the course, and any tags or labels provided by the LMS characterizing the course, such as course difficulty, whether the course has been recently updated, etc. Learning record data includes any metadata characterizing user activity with regard to different courses. For example, learning record data can include data for characterizing a state of a user with regard to a course (for example, NOT STARTED, PROGRESSING, FAILED, PASSED), as well as any other data characterizing the progression of the user through different states from NOT STARTED to PASSED or FAILED. This other data can include when the user reached a particular state with regard to a course, how long they have been in a particular state, and/or whether they have restarted or repeated the course.

The multi-LMS 100 can be configured to automatically identify certain events in interaction between user computing devices and the multi-LMS 100 as the start or end of a particular state for the user account as it relates to a particular course. For example, if a user computing device sends a request to start a course, then the multi-LMS 100 can update the user account for the device to STARTED with regard to the accessed course. If the multi-LMS 100 receives data indicating that some activity has been performed for the course, such as a submitted assignment or a video accessed/viewed, then the multi-LMS 100 can update the status of the user account to PROGRESSING with respect to the course. Similar events can be predetermined and identified as occurring for other states, such as a state of PASSED if the multi-LMS 100 determines that all requirements for a course have been met, or a state of FAILED if requirements for the course are not met, for example by a minimum passing grade or by completing all activities for the course within a predetermined period of time.

The multi-LMS 100 is configured to standardize data received from the LMSs 120 into a common format before passing the data for processing to one of engines 116, 117, 118, and/or 119. As an example, the multi-LMS 100 can implement one or more pipelines each corresponding to a type of data to receive from the LMSs 120, such as the course data and the learning record data. Each pipeline can be configured to parse incoming data and convert the incoming data as a data object with fields recognized by the multi-LMS 100 and its different components. The pipeline can be configured to parse data differently depending on how that data is received from a particular LMS.

As another example for creating a pipeline to receive the incoming data, the LMSs 120 can be exposed by one or more Application Programming Interfaces (API) of which a pipeline for the multi-LMS 100 can use to request data from the LMSs 100. The multi-LMS 100 can then store the received data in the format retrieved after invoking an API call for data to the LMSs 120, or the multi-LMS 100 can perform additional processing to convert the data into a format suitable for processing by the multi-LMS 100. In addition, the multi-LMS 100 can be configured to assign a unique identifier for each course, regardless of which LMS the course is from originally.

After receiving the data, the multi-LMS 100 can store and/or process the data according to different engines implemented by the multi-LMS 100, including a catalog engine 116, a learning records engine 117, a learning state engine 118, and an assignment engine 119.

The catalog engine 116 is configured to store course data received from the LMSs 120. The catalog engine 116 can communicate with the catalog service 113, and provide course data responsive to requests for data sent to the multi-LMS user interface 102 from the user computing devices 140. For example, a user computing device may request course data for courses available for a particular topic, such as "Java Functional Programming" The catalog service 113 can receive the request and query the catalog engine 116. The catalog engine 116 can return courses responsive to the query to the catalog service 113, which in turn can pass the data to the requesting user computing device. The user computing device can present the requested data on a display of the device.

The catalog engine 116 can maintain and update assigned tags or labels for the difficulty of each course in the catalog. As described herein and in reference to FIG. 2A, the multi-LMS 100 can be configured to identify overall difficulty measures based on analyzing data, such as data characterizing the expertise of the target user base and difficulty scores of the courses provided by users. The catalog engine 116 can be further configured to augment or add labels from courses of the LMSs 120, which otherwise have little to no contextual relationship to the user base accessing the multi-LMS 100.

The learning records engine 117 is configured to store learning record data received from the LMSs 120. The learning records engine 117 can be queried, for example by the learning state engine 118 to provide learning record data for one or more users. In some examples, the user computing devices 140 can communicate with and query the learning records engine 117 to receive learning record data. The exact type and/or level of detail of accessible information can depend on permissions available to the user account of the user computing device making the request. As described herein, a learner user account may only be able to query for learning record data for the user corresponding to the user account. On the other hand, a manager user account may be able to query learning record data for one or more user accounts assigned as learners under the manager user account.

The learning state engine 118 is configured to update and maintain states for different user accounts with regard to different courses. For example, as the multi-LMS 100 detects that a new course is accessed and progressed through by a user computing device, the multi-LMS 100 can update the state of the user account with respect to those accessed courses. As with data maintained by the learning records engine 117 and the catalog engine 116, the learning state engine 118 can communicate with the learning state service 114 to provide data in response to requests for the state attributed to a user account with regard to one or more courses.

The assignment engine 119 is configured to generate a sequence of courses for a target user, as described in more detail with regard to FIG. 3. The assignment engine 119 can interface with the assignment service 115, which can receive requests from user accounts to update or generate a sequence of courses for a target user. For example, a user computing device for a manager user account may send a request to generate a sequence of courses for a target topic and for a user that is managed by the manager of the manager user account.

The assignment engine 119 can receive feedback data about courses about the target topic, and use the feedback data to generate labels of overall difficulty for the courses. The assignment engine 119 can pass the generated labels to the catalog engine 116, and the catalog engine 116 can be configured to receive and update course data according to the received labels. After generating the sequence of courses, the multi-LMS 100 through the assignment engine 119 and user interface 102 can provide data corresponding to the sequence of courses to the requesting user computing device. The requesting user computing device can present the received data and receive input to confirm or to modify the sequence of courses, as described in more detail with reference to FIGS. 2A-B and FIGS. 4A-B.

Example Methods

Figure 2A:
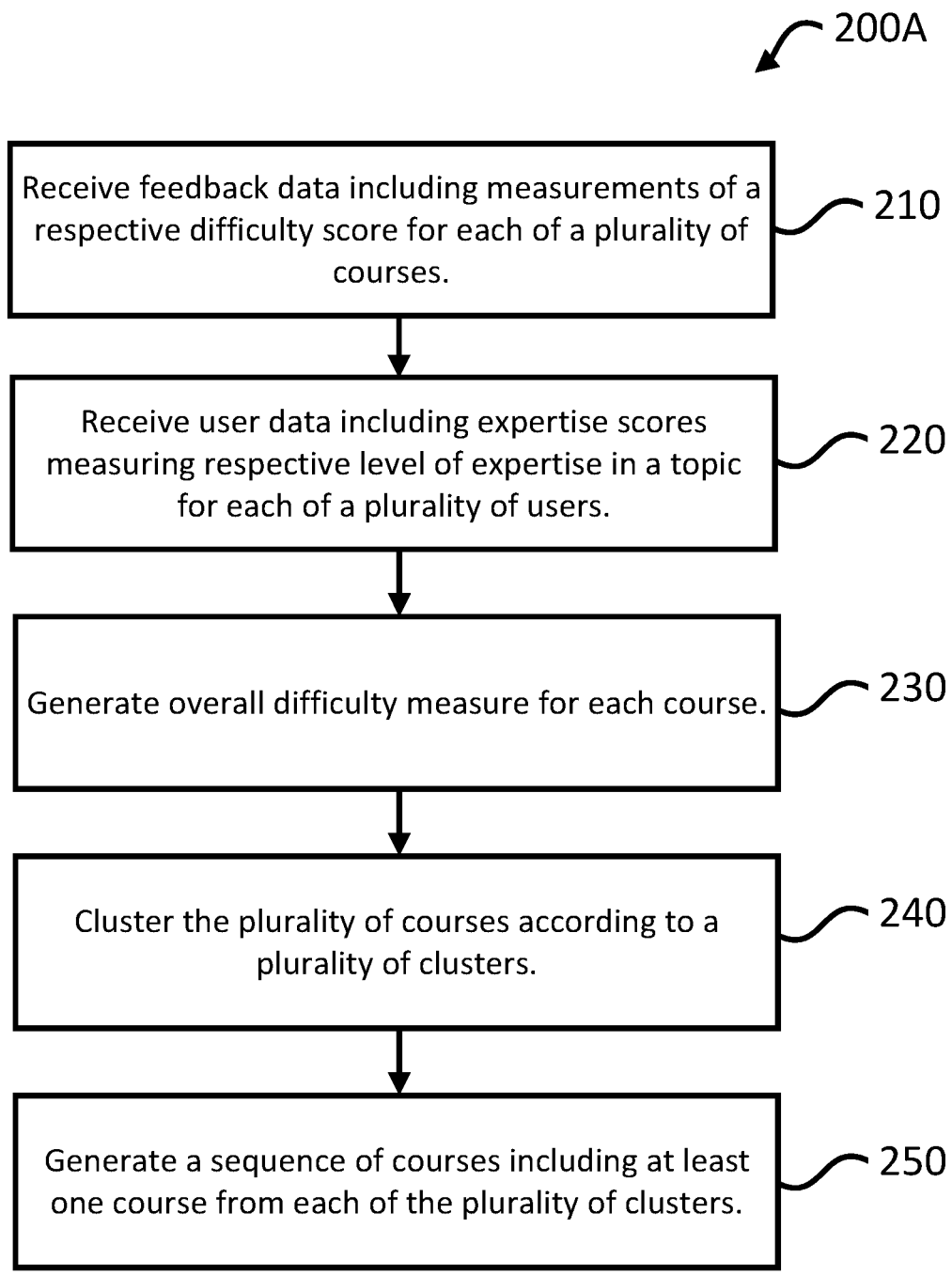
FIG. 2A is a flow chart of an example process for generating a learning path for a target user, according to aspects of the disclosure.
Figure 2B:
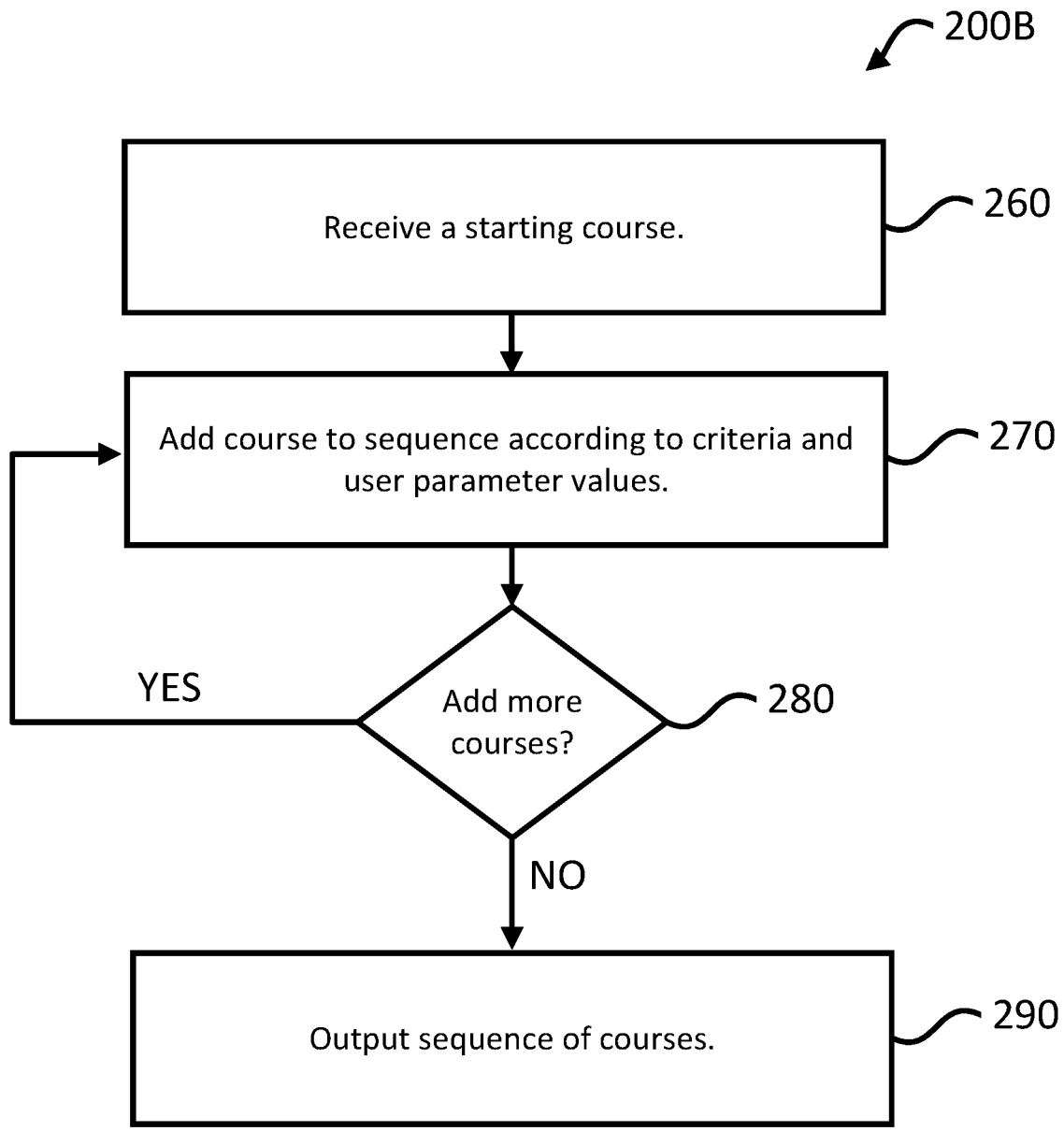
FIG. 2B is a flow chart of an example process for generating the sequence of courses for the learning path.

FIG. 2A is a flow chart of an example process 200A for generating a learning path for a target user, according to aspects of the disclosure. FIG. 2B is a flow chart of an example process 200B for generating the sequence of courses for the learning path. The processes 200A and 200B are described as being performed by a system that includes one or more processors, located in one or more locations, and programmed in accordance with aspects of the disclosure. For example, an assignment engine of a multi-LMS, such as the multi-LMS 100 of FIG. 1, can perform the process 200A.

As shown in block 210, the multi-LMS receives feedback data including measurements of difficulty scores for a set of courses. The courses can be offered from one or more LMSs in communication with the multi-LMS, and generally correspond to a target topic, such as "Functional Programming."

The feedback data can include feedback in response to prompts sent to user computing devices for users of the multi-LMS user base. As an example, the prompts can be sent as a questionnaire with questions that include asking the perceived difficulty of a course on a scale from 1-10. The feedback can be received as responses to the prompts. The user computing devices that are sent the prompts can be associated with users that the multi-LMS has identified as having taken and/or passed at least one of the courses in the set of courses. In some examples, prompts for feedback are only sent to user computing devices of users in which a corresponding user account is indicated as having a PASSED state for courses related to the target topic. As an example, a prompt can be sent to a user computing device shortly after the state for a corresponding user account is updated to PASSED by the multi-LMS.

The feedback data can also include information tagged to courses in the catalog of the multi-LMS. For example, the feedback data can include labels of difficulty for each course. For example, the system can receive a difficulty label for a course that is received as part of course data from an individual LMS. The system can convert the difficulty label to a difficulty score and process the score with multiple other difficulty and expertise scores in the feedback and user data. As described herein, the multi-LMS can be configured to update the labels of different courses by difficulty after determining a clustering. Once a course has been labeled by the multi-LMS, the multi-LMS can later use that label, for example as input in addition to other sources of feedback, to generate new clusters and/or sequences of courses.

As shown in block 220, the multi-LMS receives user data including expertise scores measuring a respective level of expertise in the particular topic for users in the multi-LMS user base. User data, including the expertise scores, is voluntarily submitted by the users, for example in response to prompts sent to corresponding user computing devices. No personal or sensitive data, such as data personally identifying the users, is collected. Further, no data is collected without the knowledge and approval of users of the user base.

Similar to the feedback data, the expertise scores can be received in response to prompts sent to various user computing devices associated with different users of the user base. The multi-LMS can identify users who have taken the course, and prompt corresponding user computing devices with questions relating to a perceived level of expertise or knowledge a user has for the particular topic of the course.

For example, the user data can include user-reported expertise scores on a predetermined scale, for example 1-10, where 1 indicates little to no knowledge of a particular topic, and 10 represents complete mastery of the topic. The feedback and user data can be obtained at or near the same time, for example as part of separate sections of a prompt sent to a user computing device.

In some implementations, responses indicating a difficulty score for a course can be weighted by expertise scores reported by users of the user base on a topic covered by the course. These weights can be used as additional signals for determining the overall difficulty measure of a given course, for example because the system can adjust the difficulty score reported by a user lower or higher as a function of their expertise score.

An expertise score for a user can be received from a user computing device of the user. Expertise scores can include scores received from a user computing device corresponding to the target user, and/or expertise scores received from user computing devices corresponding to other users of the user base. Prompts with questions related to the expertise of a target user can be sent to user computing devices of users who are managed by the same manager as the target user, as an example.

In some implementations, the multi-LMS can be configured to automatically generate prompts with questions regarding the expertise of a target user, based on computer source code or other documents identified as authored by the target user. For example, these documents can include submissions to different courses from a user computing device associated with the target user. As another example, the multi-LMS can be configured to receive and process documents shared internally in a network including the user computing devices, such as an internal network for an enterprise. Documents shared by a user computing device of a target user can relate to projects or other work product performed by the target user.

The multi-LMS can analyze these documents using any of a variety of different text processing techniques, and identify, for example, key words or phrases related to different topics for courses offered by the multi-LMS. For example, the multi-LMS may categorize the processed documents as source code written in a particular programming language, such as Java. The multi-LMS can then send prompts to user computing devices for information related to the target user's expertise in Java. As another example, the multi-LMS can process feedback and comments made by other users to a document authored by the target user, and the most frequently used phrases can be mapped to tags or other descriptors for courses maintained by the system. Additional topics of interest to the target user can be extracted from the topics of courses mapped by the multi-LMS.

Besides using the information to generate prompts to expertise scores of a target user for different topics, the multi-LMS can be configured to send this information to a user computing device of a manager for the target user, which can also provide additional context for which topics the target user may need learning paths assigned.

As shown in block 230, the multi-LMS generates an overall difficulty measure for each course. The multi-LMS can generate the overall difficulty measure as a function of at least feedback and user data corresponding to a course. As an example, the input to generating the overall difficulty measure can include feedback data corresponding to difficulty scores of a given course, and expertise scores in the topic corresponding to the given course. The expertise scores can be scores reported of users providing the difficulty scores for the given course.

In some cases, the impact of a difficulty score on the overall difficulty measure can be adjusted at least in part based on expertise scores reported at or near the same time, as described above with reference to a single prompt having sections for both user and feedback data. As an example, a high difficulty score may have a higher impact on the overall difficulty measure if the difficulty score is reported by a device that also reported a high expertise score reported for a user of the device. In other words, higher difficulty scores may be weighed more heavily if associated with users that also report high expertise scores on the given topic.

The multi-LMS can be configured to aggregate the scores, for example by generating the average difficulty score and average expertise score. From the aggregated difficulty and expertise scores, the multi-LMS can generate the overall difficulty measure, for example as a multi-dimensional vector or tuple of values representing the aggregated difficulty and expertise scores.

Figure 3A:
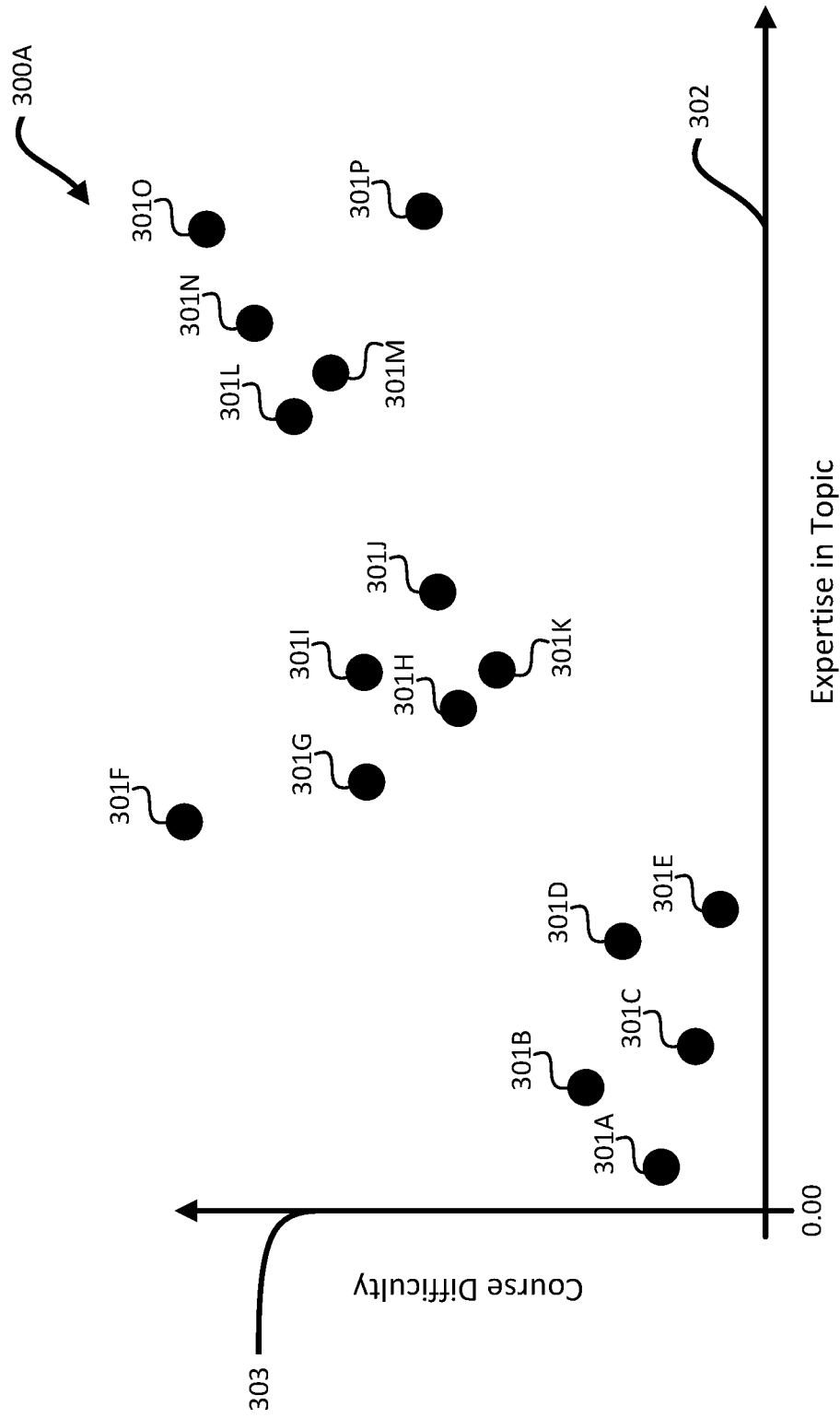
FIG. 3A is a chart tracking course difficulty to perceived expertise in a topic by users for multiple courses.

FIG. 3A is a chart 300A tracking course difficulty to perceived expertise in a topic by users for multiple courses, represented by data points 301A-P. The chart 300 includes an x-axis 302 tracking expertise in a topic by aggregated expertise scores reported for each course, and a y-axis 303 tracking course difficulty by aggregated course difficulty scores reported for each course. Generally, data points closer to the left side of the chart 300A and the origin (0,0) correspond to courses in which reported expertise scores were lower than courses to the right of the chart 300A. Similarly, data points on the lower side of the chart 300A and the origin (0,0) correspond to courses with a lower reported difficulty score, as compared with data points higher in the chart 300A.

Combining the two measures of difficulty score and expertise score, data points in the lower-left side of the chart 300A correspond to courses with low difficulty scores but that were also rated by users with low expertise scores in the topic corresponding to the courses. Data points in the upper-right of the chart 300A correspond to courses that were rated as generally more difficult by users that were also generally rated highly in expertise in the topic corresponding to the courses.

As shown in block 240, the multi-LMS clusters the set of courses into one or more clusters. The multi-LMS can cluster the courses, for example, based on the generated overall difficulty measure for each course. The multi-LMS can receive parameter values indicating how many clusters should be generated, as well as other parameter values specifying the size of each cluster (for example, measured in number of courses in the cluster), and/or the range of overall difficulty measures that are included in the cluster. The parameter values can be received, for example from a user computing device of a manager user for the target user. Each cluster is associated with a respective range of overall difficulty measures, and courses in the cluster have measures falling within that respective range.

For example, the number of clusters can correspond to predetermined difficulty labels, such as "easy," "medium," and "hard." More or fewer clusters can be specified to adjust the granularity of how courses are clustered. As described herein, a sequence of courses can include a minimum number of courses from each cluster. In this way, the sequence of courses can represent increasingly difficult courses from the first course in the sequence to the last. The clustering can be performed according to any known clustering technique, such as k-means clustering.

In some implementations, in addition to using the clusters as part of generating a sequence of courses as described herein, the multi-LMS can also use the clusters to generate new labels for the courses maintained by the multi-LMS. Courses from different LMSs may not have a difficulty label, or if they do have a difficulty label, it may be arbitrarily applied or applied relative to courses offered for that particular LMS. In other words, for a user base of a multi-LMS, existing labels may not accurately reflect a difficulty relative to the skills and abilities of the user base.

Because the courses are clustered at least by overall difficulty measure, the clustering can provide contextual information about the appropriate label for the course relative to the user base providing the difficulty and expertise scores for each course. The number of clusters can be adjusted to match a full range of potential difficulty labels that the multi-LMS may use to label courses in a maintained catalog. For example, if the range of difficulty levels for the multi-LMS is three (for example, "easy," "medium," and "hard"), then the courses for each topic available on the multi-LMS can be clustered into three clusters. Then, depending on which cluster a course is placed in by the multi-LMS, the multi-LMS can update its label for the course in the catalog, potentially overriding previous labels received from an LMS hosting the course.

In some examples in which the same course is hosted on multiple LMSs, updating the labels as described herein can resolve conflicts from inconsistent labels applied to the course. Further, the labeling promotes clarity in interaction with the multi-LMS by providing a consistent basis for which to label the difficulty of each course, in a manner that is sensitive to feedback from the user base for the system.

Figure 3B:
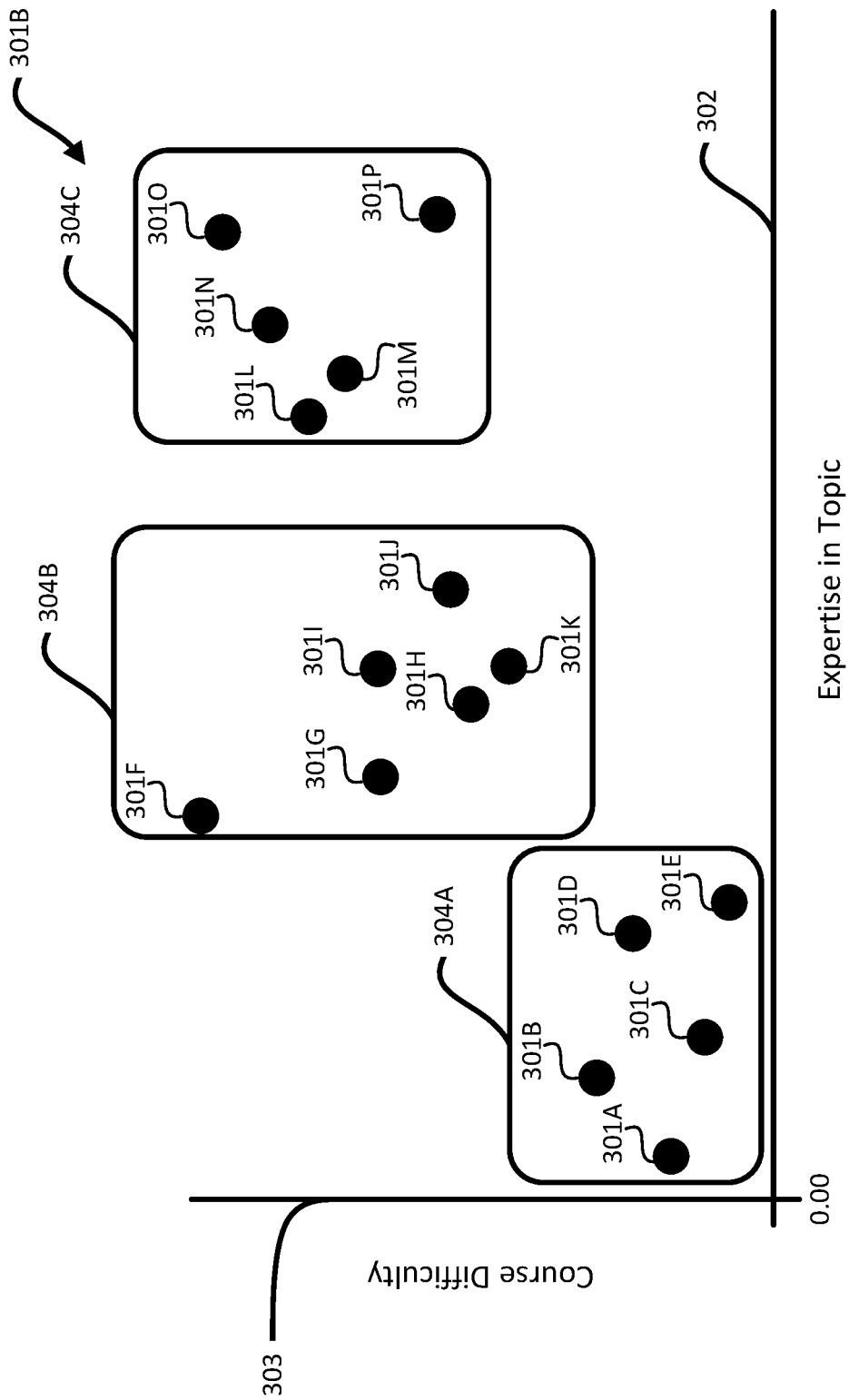
FIG. 3B is a chart showing an example clustering of the multiple courses.

FIG. 3B is a chart 300B showing an example clustering of the multiple courses, represented by the data points 301A-P. In the chart 300B, the data points 301A-P of overall difficulty measures are clustered into three clusters 304A-C, although more or fewer clusters could be used depending on parameter values provided. As an example, courses whose data points fall in the cluster 304A can be labeled "easy"; courses whose data points fall in the cluster 304B can be labeled "medium"; and courses whose data points fall in the cluster 304C can be labeled "hard."

As shown in block 250, the multi-LMS generates a sequence of courses for a target user, including at least one course from each cluster. As part of generating the sequence of courses, the multi-LMS can receive a request to generate a learning path from a user computing device, for example a user computing device for a manager of the target user. The multi-LMS can perform one or more steps of the process 200A prior to receiving the request, such as receiving the feedback/user data, generating the overall difficulty measures, and clustering the courses, as described herein with reference to blocks 210-240 of FIG. 2A.

In addition to receiving the request to generate the learning path, the multi-LMS can receive a number of input parameter values specifying how the multi-LMS should generate the sequence of courses. As an example, the input parameter values can include the topic that should correspond to the courses in the generated sequence. The input parameter values described for clustering the courses according to block 240 can also be received as part of a request to generate the learning path.

The multi-LMS can receive a starting difficulty threshold, based at least on expertise scores for the target user reported from user computing devices corresponding to different users of the user base, for example users of the user base who may be knowledgeable about the skill set of the target user. As an example, these users can include users associated with the same manager user as the target user. As other examples, these users may be users that the system has identified as working on the same or similar projects, for example based on common authorship in analyzed source code and/or other documents.

Based on the expertise scores, the multi-LMS can determine the starting course and subsequent courses in the sequence to include only courses whose overall difficulty measure meets or exceeds the starting difficulty threshold. For example, the starting difficulty threshold may exclude courses in a first cluster whose overall difficulty measures fall below the threshold. The sequence of courses can be generated starting with courses in a subsequent cluster. The starting difficulty threshold can also be received as a parameter value as part of a request to generate a learning path for a target user.

The sequence of courses can be generated with additional criteria or parameters that are predetermined or provided to the multi-LMS. For example, the multi-LMS can generate a sequence with a minimum or maximum length, a target difficulty threshold for a final course in the sequence, and/or a minimum or maximum number of courses per cluster. Values for these parameters can be received from the requesting computing device.

Intra-cluster criteria are another example of criteria that can be provided or predetermined by the multi-LMS. Intra-cluster criteria specify conditions for how the multi-LMS should arrange courses in the sequence that are from the same cluster. One example criterion is increasing overall difficulty, such as how the multi-LMS arranges courses in the sequence in ascending overall difficulty across multiple clusters. Other example criteria include the popularity of a course in the cluster, for example measured by the number of users reported as having taken the course; and the age of the course in the catalog of the multi-LMS, for example to prefer courses that are newer over older courses. The multi-LMS can apply intra-cluster criteria automatically and/or in response to parameter values received from the requesting computing device.

The multi-LMS can also check the state of a user account corresponding to the target user relative to different courses related to the topic of interest. The multi-LMS can filter out courses for which the user account has already PASSED, according to a stored state.

The multi-LMS can also use learning state data to adjust the starting/target difficulty threshold of the sequence of courses. For example, if courses are marked with a FAILED state for a user account corresponding to the target user, then the multi-LMS will omit courses from the sequence with an overall difficulty measure higher than the FAILED course. Similarly, the multi-LMS can be determined that one or more courses are marked with a PASSED state, then the multi-LMS can omit courses with a lower overall difficulty threshold than the PASSED courses.

FIG. 2B is a flow chart of an example process 200B for generating the sequence of courses for the learning path. The process 200B can be performed by a multi-LMS as part of generating the sequence of courses, as described herein according to block 250.

The multi-LMS receives a starting course, according to block 260. The starting course can be identified by the multi-LMS in a first cluster of courses that are of generally lower overall difficulty measures than other clustered courses. As another example, the starting course can be identified from a cluster corresponding to a starting difficulty threshold specified by user-provided or predetermined parameter values for generating the sequence of courses. If multiple courses can be selected from the starting cluster, the multi-LMS can apply predetermined or user-provided intra-cluster criteria for selecting a course as the starting course of the sequence.

The multi-LMS adds a course according to criteria and parameter values provided to the multi-LMS. As described herein with reference to FIG. 2A, the criteria and parameter values can be user-provided or predetermined as part of the configuration of the system. For example, the multi-LMS can determine one or more candidate courses to add that satisfy the criteria and parameter values. The candidate courses may be from the same cluster. In the event of multiple candidate courses, the multi-LMS can be configured to apply additional criteria, as described herein, for breaking any ties. For example, the multi-LMS may select a candidate course that has been most recently published and/or has the highest reviews of users who have rated the course. In some examples, the multi-LMS can also select a candidate course randomly when more than one candidate course is available.

As another example criterion for tie-breaking, the multi-LMS can select a course that would result in the smoothest increase in overall difficulty in progression by the target user through the sequence of courses. Generally, the multi-LMS selects courses for the sequence such that earlier courses have a lower overall difficulty threshold than later courses in the sequence. This ascending-difficulty requirement can be applied in conjunction with the other criteria and parameters, described herein. Between multiple candidate courses, the multi-LMS can select the course that most closely matches increases in difficulty between other courses in the sequence. For example, if courses generally progress in difficulty by a linear factor through the sequence, the multi-LMS can select a next course such that the linear factor persists in the sequence and is similar to the rate of increase of difficulty between courses throughout the sequence.

The multi-LMS determines whether to add more courses, according to block 280. The multi-LMS can compare the current number of courses against a predetermined or provided parameter value specifying the maximum sequence length. The multi-LMS can determine whether the maximum sequence length has been met for the sequence. If the length has been met, the multi-LMS determines not to add more courses.

If the multi-LMS determines to add more courses, according to block 280, then the multi-LMS adds another course to the sequence according to block 270. If the multi-LMS determines not to add more courses, then the multi-LMS outputs the current sequence of courses, according to block 290.

Figure 3C:
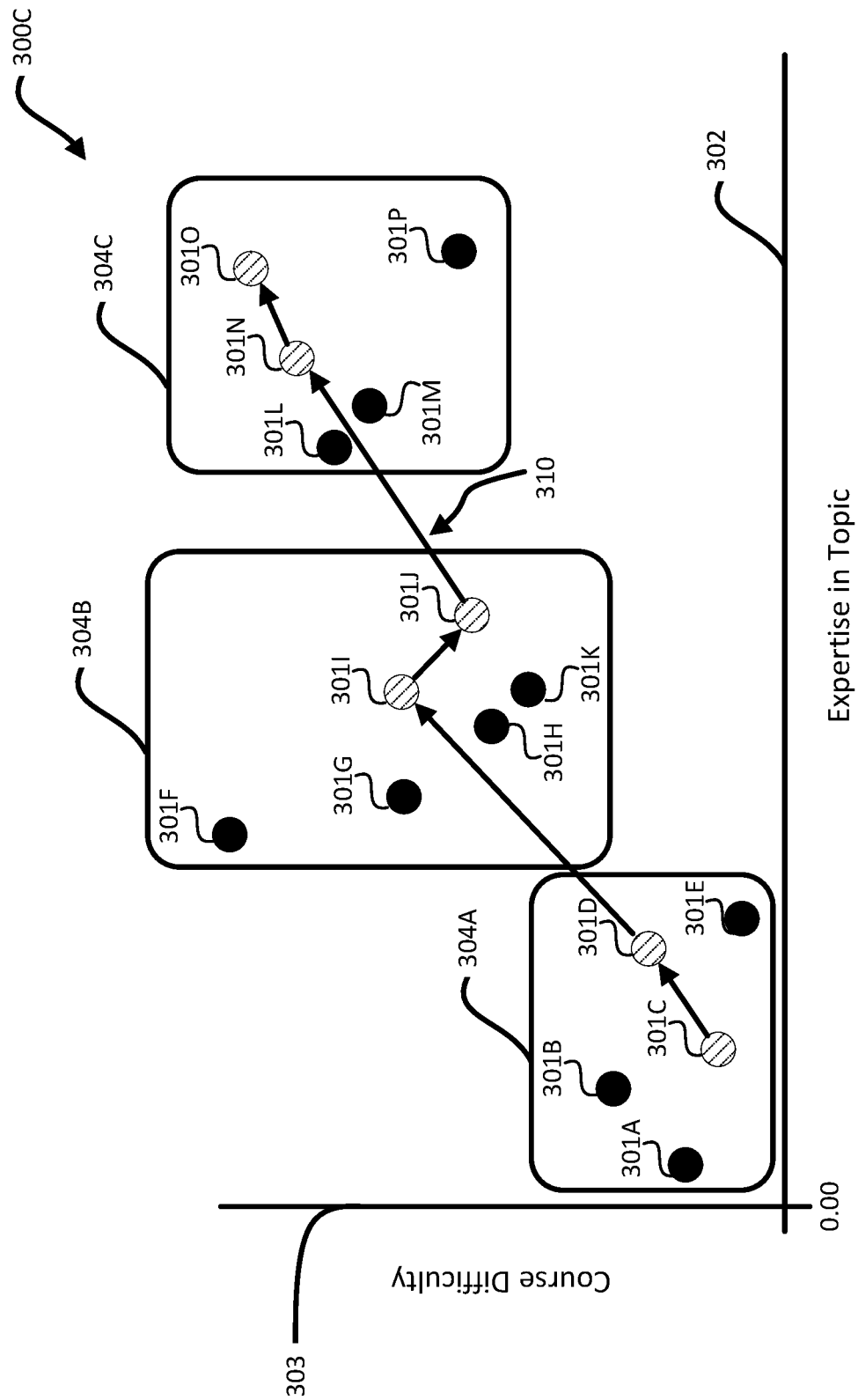
FIG. 3C is a chart showing an example sequence of courses from a first cluster through a third cluster.

FIG. 3C is a chart 300C showing an example sequence of courses 310 from a first cluster 304A through a third cluster 304C. In the chart 300C, data points of courses that are in the generated sequence of courses are shown with thatch marks, including data point 301C, 301D, 301I, 301J, 301N, and 301O. In the example sequence of courses 310, the parameters from which the multi-LMS generated the sequence of courses 310 included parameters specifying two courses per cluster, six courses total, a starting difficulty of "easy" (corresponding to the cluster 304A, for example and as described herein), and a target difficulty of "hard" (corresponding to the cluster 304C). As described herein with reference to FIGS. 4A-B, the sequence of courses 310 can be presented on a display of a requesting computing device, with substitutions and modifications made before generating and sending the final sequence of courses to the computing device for the target user.

Figure 4A:
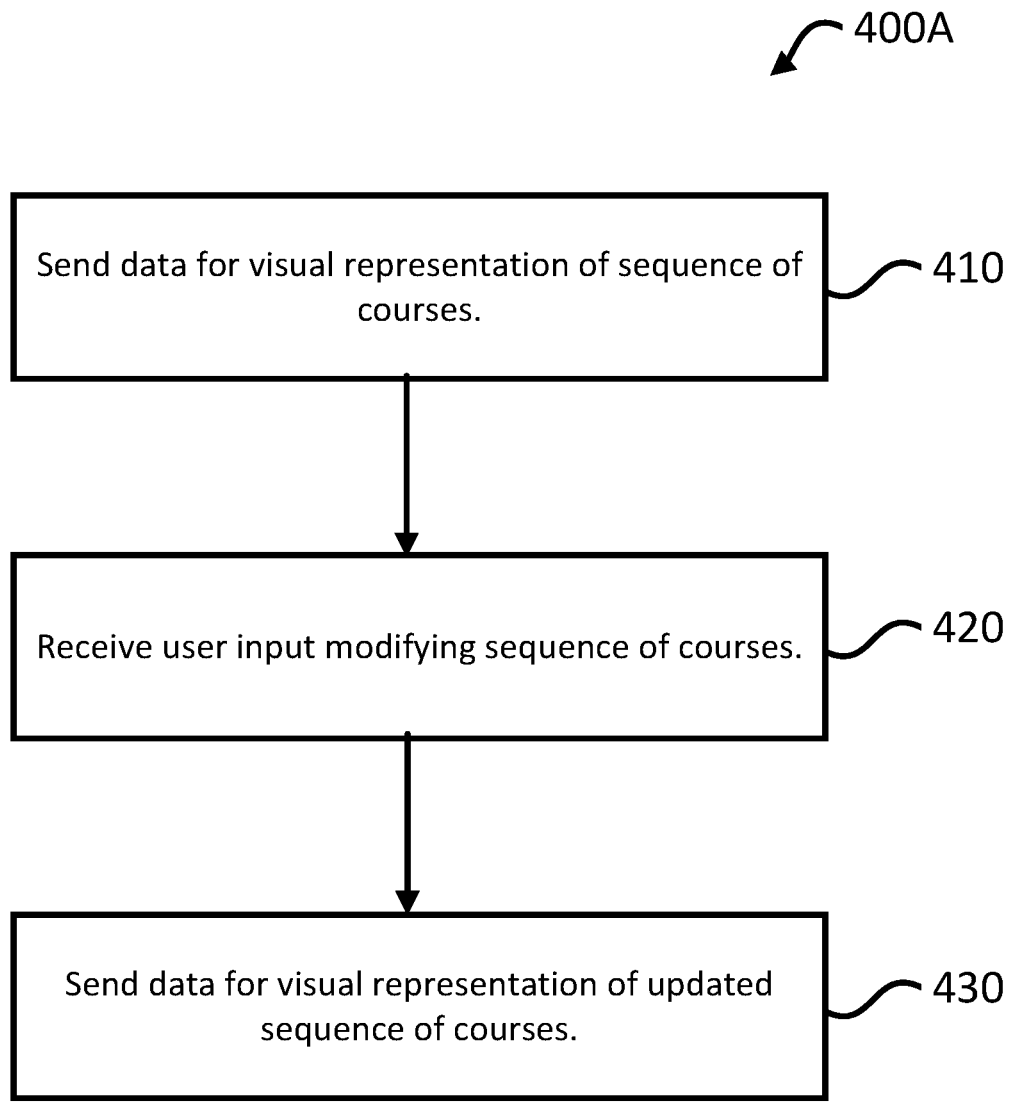
FIG. 4A is a flow chart of an example process for modifying the sequence of courses, according to aspects of the disclosure.

FIG. 4A is a flow chart of an example process 400A for modifying a sequence of courses, according to aspects of the disclosure. The multi-LMS can provide a user interface for displaying a generated sequence of courses, as well as for receiving input for modifying a generated sequence of courses. As an example, the multi-LMS can send a sequence of courses as a proposed learning path to a user computing device that originally provided the request to generate the learning path. The multi-LMS can prompt the user computing device to confirm the sequence of courses. In addition or alternatively, the multi-LMS can receive input to replace some courses with other courses received. For example, the requesting user computing device may send courses to replace other courses based on user preference.

Figure 4B:
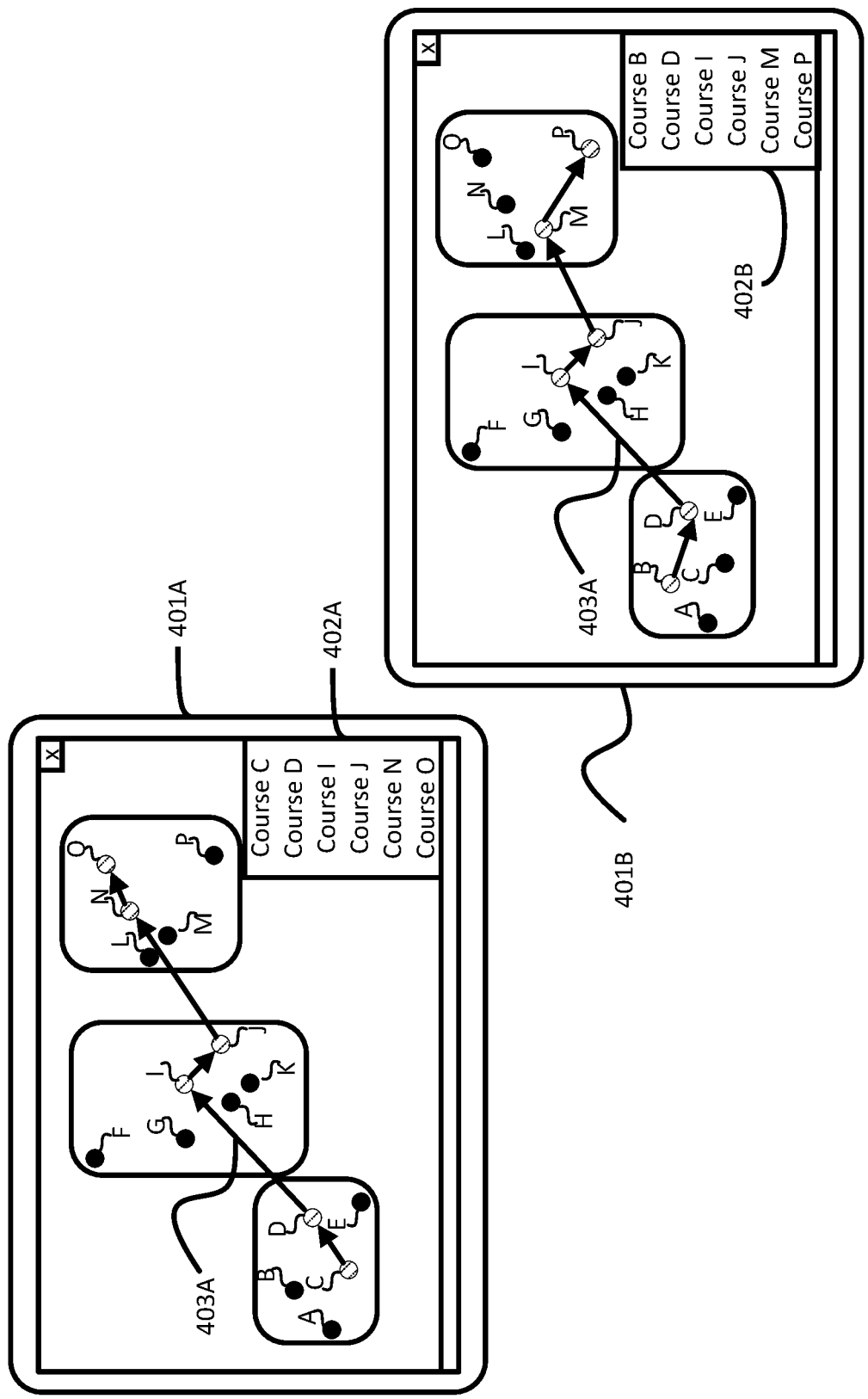
FIG. 4B shows example user interfaces before and after receiving input to modify the sequence of courses.

The multi-LMS sends data for a visual representation of a sequence of courses, according to block 410. The data can include data corresponding to sequence of courses, and/or information relating to the target user for which the sequence of courses is generated. The requesting computing device can be configured to receive and render the data, for example using a web-based application or browser, or another dedicated application installed on the requesting computing device. FIG. 4B, herein, shows example user interfaces that can be rendered by the user computing device requesting the learning path, or generally any device interacting with the multi-LMS requesting data relating to a sequence of courses for a specified user.

The multi-LMS receives user input modifying the sequence of courses, according to block 420. The user input can be received from a user interface displayed on the requesting computing device, as shown for example in FIG. 4B. User input for modifying the sequence of courses can include updated parameter values received as part of a request to generate the sequence of courses, for example an updated minimum/maximum number of courses, number of clusters, or starting/target difficulty threshold. The user input can also include input for removing, adding, or rearranging courses within the sequence.

The multi-LMS sends data for visual representation of updated sequence of courses, according to block 430. As part of sending the data for the updated sequence of courses, the multi-LMS can generate the updated sequence of courses, according to the techniques described herein but also using the user input received according to block 420. Then, the multi-LMS can send data to the requesting computing device, for example as described herein with reference to block 410.

FIG. 4B shows example user interfaces 401A-B before and after receiving input to modify a sequence of courses 403A. The user interface 401A is an example of a user interface that can be presented on a display of a user computing device, providing information relating to a sequence of courses 403A generated for a target user. The user interface 401A can present information for the sequence of courses and the target user in any one of a variety of different techniques. As shown in the user interface 401A, for example, the sequence of courses 403A is shown among other courses clustered as part of generating the sequence of courses forming the sequence of courses 403A. In addition, a table 402A is presented listing the courses of the sequence of courses 403A in tabular form. The user interface 401A-B can present any of a variety of different visual representations from data provided by the multi-LMS.

The user interface 401A can also include interactable elements (not shown) for receiving user input to modify the sequence of courses 403A. For example, the user interface 401A can be configured to receive touch or mouse click-and-drag input to rearrange courses in the sequence of courses, either through the sequence of courses 403A as shown in the user interface 401A, or by rearranging the courses in the table 402A. As another example, some courses can be selected by selecting their corresponding data point as shown in the user interface 401A, and subsequently deleted from the sequence of courses 403A. The user interface 401A can also be configured to receive new parameter values for clustering and/or generating the sequence of courses, including new parameters specifying additional or fewer clusters, a different length of courses for the sequence of courses 403A, additional or fewer courses per cluster, and/or a different starting and/or target difficulty level.

The user interface 401B shows a sequence of courses 403B modified from the sequence of courses 403A after the multi-LMS receives and processes user input to update the sequence of courses 403A. Specifically, the starting course C in the sequence of courses 403A is replaced with starting course B in the sequence of courses 403B, and the last courses N and O in the sequence of courses 403A are replaced with the courses M and P in the sequence of courses 403B. Table 402B also shows an updated list of courses following the update to the sequence of courses 403A.

After performing the update and presenting an updated visual representation to the requesting user computing device, the multi-LMS can be configured to receive additional user input for additional updates, and/or a confirmation from the requesting user computing device that the sequence of courses has been finalized. When the multi-LMS confirms the sequence of courses, the multi-LMS can then associate the sequence of courses with the user account corresponding to the target user. The multi-LMS can monitor progress on performance of courses in the sequence of courses, and send information related to that performance to the user computing device that provided the original learning path requested.

In addition or alternatively, the multi-LMS can be configured to automatically adjust a sequence of courses representing a sequence of courses in response to determining whether certain conditions have been met. One example condition can be if the multi-LMS determines that the target user has failed a course in the sequence of courses (for example, as indicated by a corresponding FAILED state for a course and the user account). In response, the multi-LMS can generate a modified sequence of courses by substituting courses with overall difficulty measures higher than that of the failed course with other courses having lower overall difficulty measures.

In some examples, the multi-LMS can receive a target deadline for completing the sequence of courses, and be configured to notify the requesting computing device if the multi-LMS determines that not all courses correspond to a state of PASSED for the user account of the target user as of the target deadline. The multi-LMS can also automatically update the sequence of courses and/or prompt the requesting computing device for input to modify the sequence. The multi-LMS can offer suggestions for modifying the sequence and provide those suggestions in a format that the requesting computing device can present as part of a user interface. The multi-LMS can also receive user input to modify the sequence of courses, even after the sequence of courses is finalized, for example through a user interface to the multi-LMS implemented by the requesting computing device.

Example Computing Environment

Figure 5:
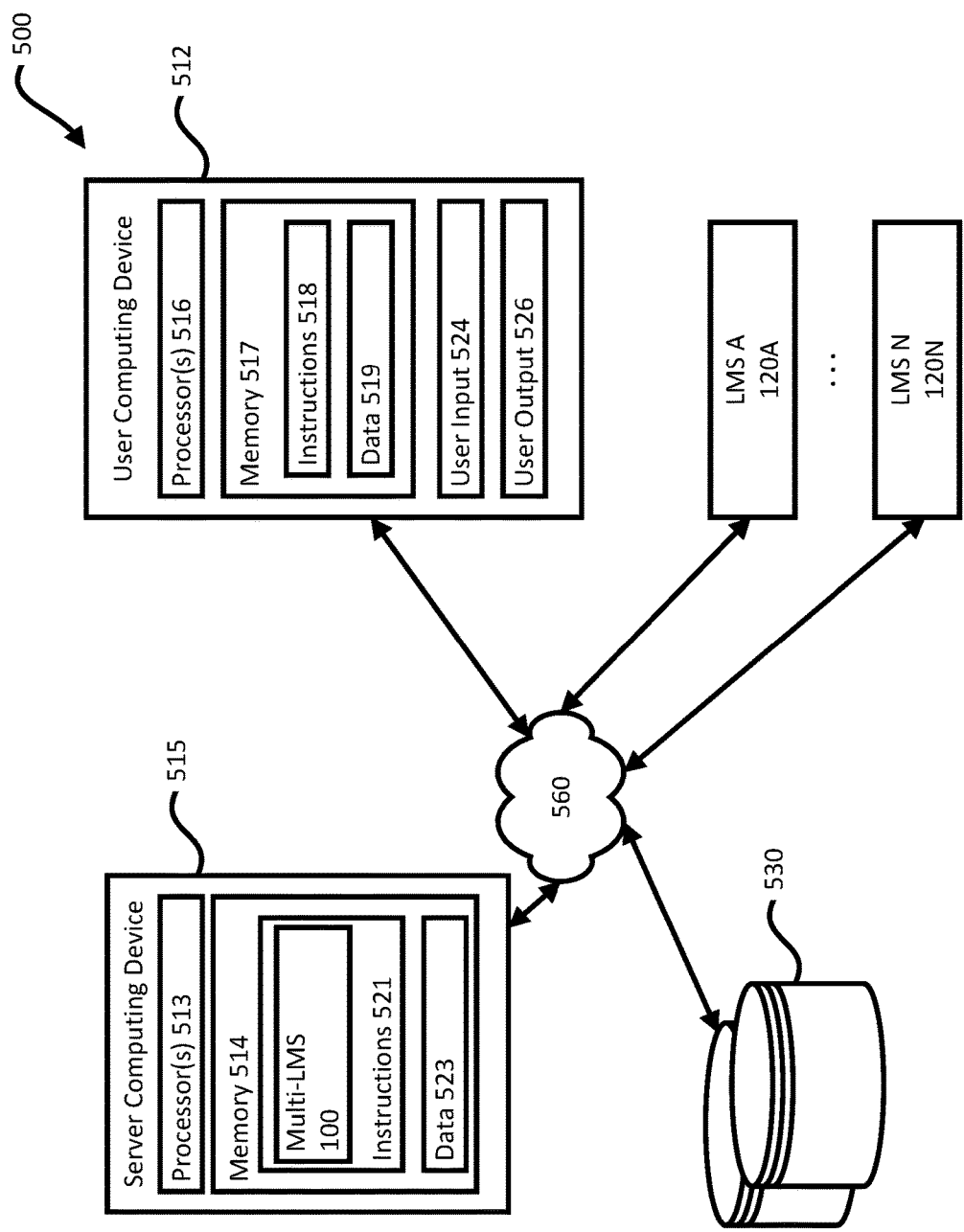
FIG. 5 is a block diagram of an example computing environment implementing the multi-LMS.

FIG. 5 is a block diagram of an example environment 500 for implementing a multi-LMS, such as the multi-LMS 100. The multi-LMS 100 can be implemented on one or more devices having one or more processors in one or more locations, such as in server computing device 515. User computing device 512 and the server computing device 515 can be communicatively coupled to one or more storage devices 530 over a network 560. The storage device(s) 530 can be a combination of volatile and non-volatile memory, and can be at the same or different physical locations than the computing devices 512, 515. For example, the storage device(s) 530 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 515 can include one or more processors 513 and memory 514. The memory 514 can store information accessible by the processor(s) 513, including instructions 521 that can be executed by the processor(s) 513. The memory 514 can also include data 523 that can be retrieved, manipulated or stored by the processor(s) 513. The memory 514 can be a type of non-transitory computer readable medium capable of storing information accessible by the processor(s) 513, such as volatile and non-volatile memory. The processor(s) 513 can include one or more central processing units (CPUs), graphic processing units (GPUs), field-programmable gate arrays (FGPAs), and/or application-specific integrated circuits (ASICs), such as tensor processing units (TPUs).

The instructions 521 can include one or more instructions that when executed by the processor(s) 513, cause the one or more processors to perform actions defined by the instructions. The instructions 521 can be stored in object code format for direct processing by the processor(s) 513, or in other formats including interpretable scripts or collections of independent source code modules that are interpreted on demand or compiled in advance. The instructions 521 can include instructions for implementing the multi-LMS 100 consistent with aspects of the disclosure. The multi-LMS 100 can be executed using the processor(s) 513, and/or using other processors remotely located from the server computing device 515.

The data 523 can be retrieved, stored, or modified by the processor(s) 513 in accordance with the instructions 521. The data 523 can be stored in computer registers, in a relational or non-relational database as a table having a plurality of different fields and records, or as JSON, YAML, proto, or XML documents. The data 523 can also be formatted in a computer-readable format such as, but not limited to, binary values, ASCII or Unicode. Moreover, the data 523 can include information sufficient to identify relevant information, such as numbers, descriptive text, proprietary codes, pointers, references to data stored in other memories, including other network locations, or information that is used by a function to calculate relevant data.

The user computing device 512 can also be configured similar to the server computing device 515, with one or more processors 516, memory 517, instructions 518, and data 519. The user computing device 512 can also include a user output 526, and a user input 524. The user input 524 can include any appropriate mechanism or technique for receiving input from a user, such as keyboard, mouse, mechanical actuators, soft actuators, touchscreens, microphones, and sensors.

The server computing device 515 can be configured to transmit data to the user computing device 512, and the user computing device 512 can be configured to display at least a portion of the received data on a display implemented as part of the user output 526. The user output 526 can also be used for displaying an interface between the user computing device 512 and the server computing device 515. The user output 526 can alternatively or additionally include one or more speakers, transducers or other audio outputs, a haptic interface or other tactile feedback that provides non-visual and non-audible information to the platform user of the user computing device 512.

Although FIG. 5 illustrates the processors 513, 516 and the memories 514, 517 as being within the computing devices 515, 512, components described in this specification, including the processors 513, 516 and the memories 514, 517 can include multiple processors and memories that can operate in different physical locations and not within the same computing device. For example, some of the instructions 521, 518 and the data 523, 519 can be stored on a removable SD card and others within a read-only computer chip. Some or all of the instructions and data can be stored in a location physically remote from, yet still accessible by, the processors 513, 516. Similarly, the processors 513, 516 can include a collection of processors that can perform concurrent and/or sequential operation. The computing devices 515, 512 can each include one or more internal clocks providing timing information, which can be used for time measurement for operations and programs run by the computing devices 515, 512.

The server computing device 515 can be connected over the network 560 to one or more LMSs, such as the LMS A 120A, the LMS N 120N, and one or more other LMSs not shown in FIG. 5. The LMSs 120A-N can be maintained as one or more computing devices separate from the multi-LMS 100.

The devices 512, 515, and the LMSs 120A-N can be capable of direct and indirect communication over the network 560. For example, using a network socket, the user computing device 512 can connect to a service operating in the datacenter 550 through an Internet protocol. The devices 515, 512 can set up listening sockets that may accept an initiating connection for sending and receiving information. The network 560 itself can include various configurations and protocols including the Internet, World Wide Web, intranets, virtual private networks, wide area networks, local networks, and private networks using communication protocols proprietary to one or more companies. The network 560 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 560, in addition or alternatively, can also support wired connections between the devices 512, 515, and the datacenter 550, including over various types of Ethernet connection.

Although a single server computing device 515, user computing device 512, and datacenter 550 are shown in FIG. 5, it is understood that the aspects of the disclosure can be implemented according to a variety of different configurations and quantities of computing devices, including in paradigms for sequential or parallel processing, or over a distributed network of multiple devices.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, module, or engine. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program, engine, or module includes one or more program instructions, that when executed by one or more processors, causes the one or more processors to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method, comprising:
receiving, by one or more processors, first data comprising one or more respective difficulty scores for each of a plurality of courses and feedback for one or more courses identified as having been completed by a first user of a plurality of users,
wherein each course corresponds to a topic and is from one or more multiple learning management systems, and
wherein receiving the feedback for the one or more courses comprises:
identifying one or more topics categorizing source code authored by the first user;
prompting one or more user computing devices for expertise scores of the first user with regard to the one or more topics; and
receiving, as part of the feedback for the one or more courses, expertise scores from the one or more user computing devices, including one or more expertise scores of the first user;
standardizing, by the one or more processors, the one or more respective difficulty scores into a common format such that the one or more respective difficulty scores can be accurately compared;
receiving, by the one or more processors, second data comprising respective expertise scores measuring a level of expertise in the topic for each of the plurality of users;
standardizing, by the one or more processors, the respective expertise scores into the common format such that the respective expertise scores can be accurately compared;
generating for each course, by the one or more processors based at least on the common format of the respective difficulty scores for the course in the first data, and common format of the respective expertise scores for at least the first user of the plurality of users, a respective overall difficulty measure for each course;
clustering the plurality of courses into a plurality of clusters,
wherein each cluster represents one or more courses,
wherein each course represented in a cluster corresponds to a respective overall difficulty measure within a respective range associated with the cluster, and
wherein courses in a first cluster with a lower overall difficulty measure precede courses in a second cluster with a higher overall difficulty measure in a sequence of courses;
identifying a starting difficulty threshold based on the respective expertise scores for the first user and the feedback for the one or more courses;
generating, by the one or more processors based on the starting difficulty threshold, the sequence of courses for the first user, comprising at least one course from each of the plurality of clusters; and
providing for output, by the one or more processors, the sequence of courses.

2. The method of claim 1, wherein each cluster corresponds to a respective difficulty label, and wherein each course in each cluster is labeled with the respective same difficulty label.

3. The method of claim 1,
wherein generating the sequence of courses comprises generating the sequence to include only courses with a respective overall difficulty threshold meeting or exceeding the starting difficulty threshold for the first user.

4. The method of claim 3, wherein generating the sequence of courses further comprises:
identifying courses that have been marked as completed by the first user; and
excluding the identified courses from the sequence of courses.

5. The method of claim 1, wherein the method further comprises:
generating, for presentation on a user interface of a user computing device, data representing:
a visual representation of the sequence of courses; and receiving, by the one or more processors, input to modify one or more of the courses in the sequence of courses, and in response to the input:
    updating the sequence of courses in accordance with the modification, and
    updating the data representing the visual representation of the modified sequence of courses.

6. The method of claim 1, wherein the method further comprises:
    receiving state data for each course in the sequence of courses, wherein the state data characterizes a respective completion state of each course by the first user;
    determining, from the state data, that a course in the sequence of courses has a completion state indicating course failure by the first user; and
    in response to the determining, generating an updated sequence of courses.

7. The method of claim 6, wherein generating the updated sequence of courses comprises updating the sequence of courses to include only courses with corresponding overall difficulty measures at or below an overall difficulty measure for the course in the sequence of courses with the course failure completion state.

8. The method of claim 1, wherein generating the sequence of courses further comprises:
    receiving a total sequence length value specifying a total number of courses to include in the sequence and a minimum per-cluster course value specifying the minimum number of courses to include in the sequence of courses for each cluster; and
    generating the sequence of courses in accordance with the total sequence length value and the minimum course value.

9. The method of claim 1, wherein generating the sequence of courses further comprises:
    receiving one or more intra-cluster criteria for arranging courses in the sequence from the same cluster; and
    generating the sequence of courses in accordance with the one or more intra-cluster criteria.

10. The method of claim 9,
    wherein the one or more intra-cluster criteria comprise an intra-cluster difficulty criterion, and
    wherein generating the sequence of courses in accordance with the one or more intra-cluster criteria comprises generating the sequence such that courses with lower overall difficulty measures precede courses from the same cluster with higher overall difficulty measures.

11. The method of claim 9, wherein:
    the intra-cluster criteria comprises one or more conditions for sequencing courses selected from a same cluster, and
    the one or more conditions includes at least one of increasing overall difficult, a popularity of a course in the same cluster, newness of the course in the same cluster, or age of the course in the same cluster.

12. The method of claim 1, further comprising:
    receiving, by the one or more processors, an input to modify the sequence of courses; and
    providing for output, by the one or more processors, the modified sequence of courses.

13. The method of claim 1, further comprising:
    comparing, by the one or more processors, the respective overall difficulty measures to add or augment at least one of a label or characteristic of at least one of the plurality of courses to provide a contextual relationship of the at least one of the plurality of courses to a target user base; and
    updating, by the one or more processors, labels or characteristics associated with the respective difficulty scores for each of the plurality of courses, maintained in a catalog engine, with the at least one of the added or augmented label or characteristic.

14. A system comprising:
one or more processors configured to:
receive first data comprising one or more respective difficulty scores for each of a plurality of courses and feedback for one or more courses identified as having been completed by a first user of a plurality of users,
    wherein each course corresponds to a topic and is from one or more of multiple learning management systems, and
    wherein receiving the feedback for the one or more courses comprises:
        identifying one or more topics categorizing source code authored by the first user;
        prompting one or more user computing devices for expertise scores of the first user with regard to the one or more topics; and
        receiving, as part of the feedback for the one or more courses, expertise scores from the one or more user computing devices, including one or more expertise scores of the first user;
standardize the one or more respective difficulty scores into a common format such that the one or more respective difficulty scores can be accurately compared;
receive second data comprising respective expertise scores measuring a level of expertise in the topic for each of the plurality of users;
standardize the respective expertise scores into the common format such that the respective expertise scores can be accurately compared;
generate, for each course, a respective overall difficulty measure based at least on the common format of the respective difficulty scores for the course in the first data, and the common format of the respective expertise scores for at least the first user of the plurality of users;
cluster the plurality of courses into a plurality of clusters,
    wherein each cluster represents one or more courses,
    wherein each course represented in a cluster corresponds to a respective overall difficulty measure within a respective range associated with the cluster, and
    wherein courses in a first cluster with a lower overall difficulty measure precede courses in a second cluster with a higher overall difficulty measure in a sequence of courses;
identify a starting difficulty threshold based on the respective expertise scores for the first user and the feedback for the one or more courses;
generate, based on the starting difficulty threshold, the sequence of courses for the first user, comprising at least one course from each of the plurality of clusters; and
provide for output the generated sequence of courses.

15. The system of claim 14, wherein each cluster corresponds to a respective difficulty label, and wherein each course in each cluster is labeled with the respective same difficulty label.

16. The system of claim 14,
    wherein generating the sequence of courses comprises generating the sequence to include only courses with a respective overall difficulty threshold meeting or exceeding the starting difficulty threshold for the first user.

17. The system of claim 16, wherein in generating the sequence of courses, the one or more processors are further configured to:
identify courses that have been marked as completed by the first user; and
exclude the identified courses from the sequence of courses.

18. The system of claim 14, wherein the one or more processors are further configured to:
generate, for presentation on a user interface of a user computing device, data representing:
a visual representation of the sequence of courses; and
receive, by the one or more processors, input to modify one or more of the courses in the sequence of courses, and in response to the input:
update the sequence of courses in accordance with the modification, and
update the data representing the visual representation of the modified sequence of courses.

19. The system of claim 14, wherein the one or more processors are further configured to:
compare the respective overall difficulty measures to add or augment at least one of a label or characteristic of at least one of the plurality of courses to provide a contextual relationship of the at least one of the plurality of courses to a target user base; and
update labels or characteristics associated with the respective difficulty scores for each of the plurality of courses, maintained in a catalog engine, with the at least one of the added or augmented label or characteristic.

20. One or more non-transitory computer-readable storage media storing instructions that when executed by one or more processors, cause the one or more processors to perform operations comprising:
receiving first data comprising one or more respective difficulty scores for each of a plurality of courses and feedback for one or more courses identified as having been completed by a first user of a plurality of users,
wherein each course corresponds to a topic and is from one or more of multiple learning management systems, and
wherein receiving the feedback for the one or more courses comprises:
identifying one or more topics categorizing source code authored by the first user;
prompting one or more user computing devices for expertise scores of the first user with regard to the one or more topics; and
receiving, as part of the feedback for the one or more courses, expertise scores from the one or more user computing devices, including one or more expertise scores of the first user;
standardizing, by the one or more processors, the one or more respective difficulty scores into a common format such that the one or more respective difficulty scores can be accurately compared;
receiving second data comprising respective expertise scores measuring a level of expertise in the topic for each of the plurality of users;
standardizing, by the one or more processors, the respective expertise scores into the common format such that the respective expertise scores can be accurately compared;
generating, for each course, a respective overall difficulty measure based at least on the common format of the respective difficulty scores for the course in the first data, and the common format of the respective expertise scores for at least the first user of the plurality of users;
clustering the plurality of courses into a plurality of clusters,
wherein each cluster represents one or more courses,
wherein each course represented in a cluster corresponds to a respective overall difficulty measure within a respective range associated with the cluster, and
wherein courses in a first cluster with a lower overall difficulty measure precede courses in a second cluster with a higher overall difficulty measure in a sequence of courses;
identifying a starting difficulty threshold based on the respective expertise scores for the first user and the feedback for the one or more courses;
generating, based on the starting difficulty threshold, the sequence of courses for the first user, comprising at least one course from each of the plurality of clusters; and
providing for output the generated sequence of courses.

* * * * *